(12) United States Patent
Wood et al.

(10) Patent No.: US 7,196,329 B1
(45) Date of Patent: Mar. 27, 2007

(54) HEAD-DOWN ENHANCED VISION SYSTEM

(75) Inventors: Robert B. Wood, Beaverton, OR (US); John P. Desmond, Lake Oswego, OR (US); John G. Wilson, West Linn, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 226 days.

(21) Appl. No.: 10/870,244

(22) Filed: Jun. 17, 2004

(51) Int. Cl.
*G02F 1/01* (2006.01)

(52) U.S. Cl. ...................................... 250/330
(58) Field of Classification Search ................. 250/330
See application file for complete search history.

(56) References Cited

U.S. PATENT DOCUMENTS

| | | | |
|---|---|---|---|
| 5,941,479 A * | 8/1999 | Sunne et al. ................ | 244/121 |
| 6,232,602 B1 | 5/2001 | Kerr ........................... | 250/330 |
| 6,373,055 B1 | 4/2002 | Kerr ........................... | 250/330 |
| 6,806,469 B2 * | 10/2004 | Kerr ........................... | 250/330 |
| 2004/0095466 A1 * | 5/2004 | Galasso ....................... | 348/143 |
| 2005/0099433 A1 * | 5/2005 | Berson et al. .............. | 345/619 |
| 2005/0232512 A1 * | 10/2005 | Luk et al. .................... | 382/276 |

OTHER PUBLICATIONS

U.S. Appl. No. 10/454,015, "Integrated Enhanced Vision System," filed Jun. 4, 2003, R.B. Wood.

* cited by examiner

*Primary Examiner*—David Porta
*Assistant Examiner*—Djura Malevic
(74) *Attorney, Agent, or Firm*—Nathan O. Jensen; Kyle Eppele

(57) ABSTRACT

An enhanced vision system for an aircraft is disclosed. The system includes an imaging sensor mounted on the aircraft. The imaging sensor detects a range of radiation emanating from a scene. A display-generating processor is operationally connected to the imaging sensor and generates symbology representing information useful to operation of the aircraft. The display-generating processor combines the generated symbology with the detected range of radiation from the imaging to create a representation of the scene. The representation of the scene is created such that the generated symbology is scaled to conformally overlay the detected range of radiation. A display is operationally connected to the processor. The display is configured to display the representation of the scene such that the representation of the scene is non-conformal with a pilot's view out of a windshield of the aircraft.

15 Claims, 4 Drawing Sheets

HEAD-DOWN ENHANCED VISION SYSTEM

FIELD OF THE INVENTION

The invention relates to the aircraft navigation, and more particularly, to the visual display of aircraft flight information for observation by a pilot.

BACKGROUND OF THE INVENTION

Head-up display (HUD) systems are currently used in aircraft to provide pilots with essential information superimposed onto their forward field of view through the aircraft windshield. The information displayed by the HUD typically includes data in a symbolic format indicative of flight conditions, such as the operating conditions of the aircraft (e.g., attitude, airspeed, and altitude), or guidance information. HUD systems are also being designed for use in automobiles and other vehicles.

A typical HUD system includes a viewing element, called a combiner, that is placed in a pilot's forward field of view. The combiner is substantially transparent but is treated to be reflective to certain wavelengths of light. When symbolic information is projected onto the combiner from a relay lens using those wavelengths, the combiner refocuses the information at optical infinity and is overlaid on the pilot's forward field of view. A HUD system may therefore be advantageously used to provide information to the pilot in all phases of flight, but use of a HUD during take-off, landing, and taxi operations offer the greatest benefits.

Another technology that provides added situational awareness to an aircraft pilot is the use of imaging sensors. A sensor such as an IR-sensing or visible-sensing camera can provide real-time images of scenes of interest to the pilot. Imaging sensors are especially useful when the sensors are configured to sense non-visible radiation wavelengths. For example, runway lights may be detected in the near infra-red wavelength range even if inclement weather partially obscures lights from the pilot's view in the visible wavelength range. As another example, a sensor that detects visible light can be configured to detect a narrow range of wavelengths corresponding to emissions from a solid-state runway light such as an LED source. The output from IR-sensing or visible-sensing cameras have been provided to the pilot or co-pilot in a head-down display format. In this way the pilot and co-pilot can view the sensor output.

There has been some interest in combining images from an imaging sensor with HUD symbology on a HUD combiner such that the displayed image is conformal with, or overlays, a pilot's view through the windshield. Such a combination of situational technologies (HUD plus imaging sensor), known as an enhanced vision system or EVS systems, would further assist a pilot in guidance and navigation. Unfortunately, there are some situations where it is not feasible to install or use a complete HUD system. For example, some airplane cockpits may not have enough space in which to install a HUD combiner between the pilot and the aircraft windshield. The cost of a full HUD system also may be too expensive to install on some aircraft.

It is therefore an object of the invention to provide HUD symbology and imaging sensor outputs to a pilot of an aircraft where it is not feasible to provide a complete HUD system.

It is also an object of the invention to provide such symbology and outputs in a cost-effective manner.

It is a further object of the invention to provide an enhanced vision system that may be used with previously installed avionics equipment.

A feature of the invention is the simultaneous display of HUD symbology and images detected from imaging sensor on a head-down display in the aircraft.

An advantage of the invention is that enhanced vision system functionality may be provided in aircraft that are not able to install or use a complete HUD system.

SUMMARY OF THE INVENTION

The invention provides an enhanced vision system for an aircraft including an imaging sensor mounted on the aircraft. The imaging sensor detects a range of radiation emanating from a scene. A display-generating processor is operationally connected to the sensor and generates, from inputs relating to aircraft operation, symbology representing information useful to operation of the aircraft. The display-generating processor combines the generated symbology with the detected range of radiation from the imaging sensor to create a representation of the scene. The representation of the scene is created such that the generated symbology is scaled to conformally overlay the detected range of radiation. A display is operationally connected to the processor. The display is configured to display the representation of the scene such that the representation of the scene is non-conformal with a pilot's view out of a windshield of the aircraft.

The invention also provides an enhanced vision system for an aircraft, including means for detecting a range of radiation emanating from a scene. The invention also includes means for generating symbology representing information useful to operation of the aircraft and for combining the generated symbology with the detected range of radiation to create a representation of the scene such that the generated symbology is scaled to conformally overlay the detected range of radiation. The means for generating is operationally connected to the means for detecting. The invention further includes means for displaying the representation of the scene such that the representation of the scene is non-conformal with a pilot's view out of a windshield of the aircraft. The means for displaying is operationally connected to the means for generating.

The invention further provides a method of providing enhanced vision system functionality in an aircraft. According to the method, a range of radiation emanating from a scene is detected. Symbology is generated representing information useful to operation of the aircraft. The generated symbology is combined with the detected range of radiation to create a representation of the scene such that the generated symbology is scaled to conformally overlay the detected range of radiation. The representation of the scene is displayed on an aircraft head-down display.

DETAILED DESCRIPTION OF THE DRAWINGS

Figure 1:
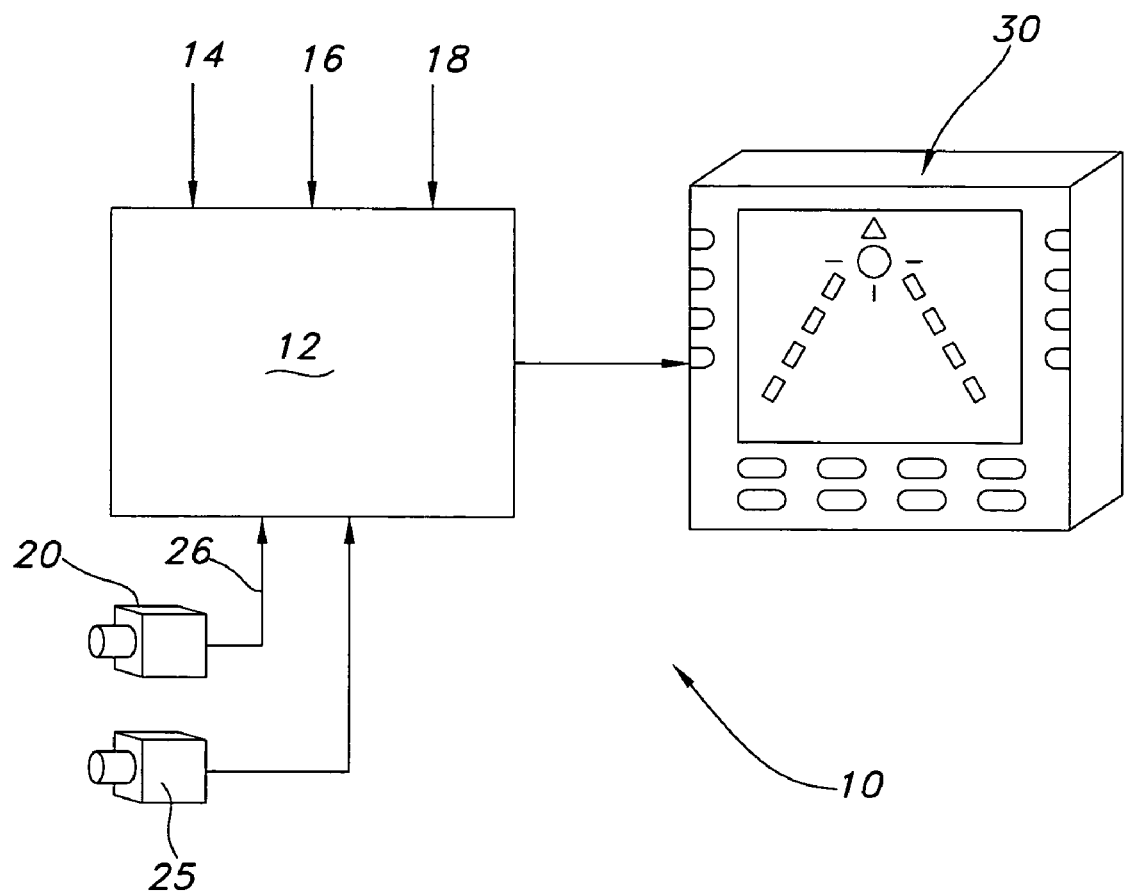
FIG. 1 is a schematic diagram of a system according to the invention.
Figure 2:
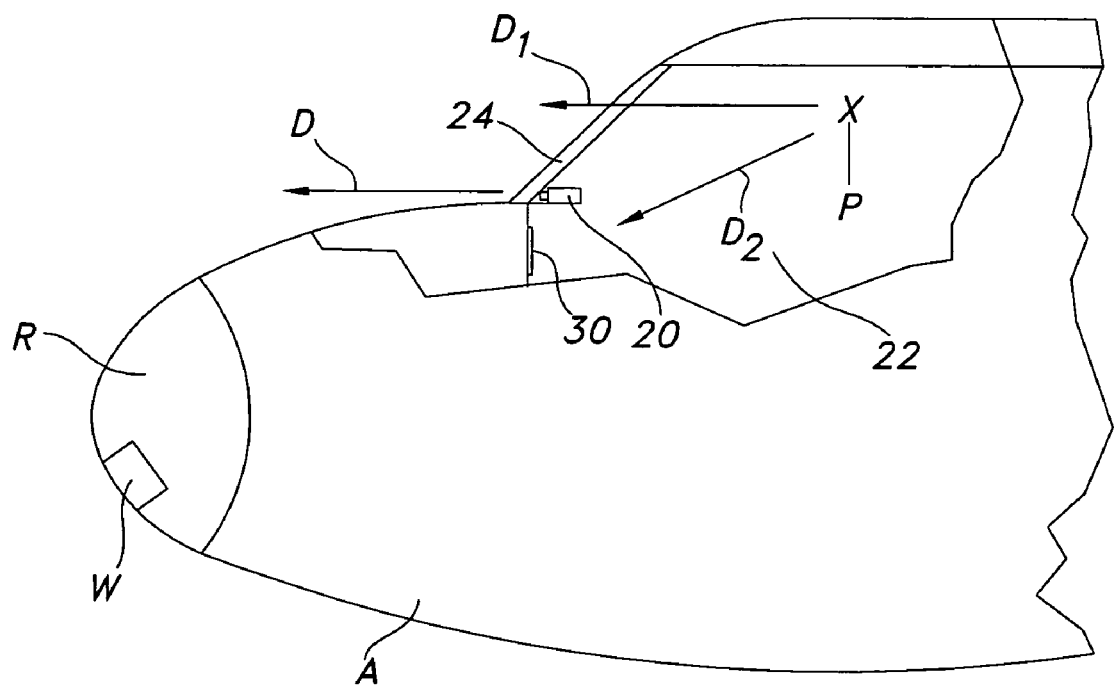
FIG. 2 is a side elevational view of an aircraft according to the invention.

FIGS. 1 and 2 depict an enhanced vision system 10 (EVS) according to an embodiment of the invention. System 10 includes a processor 12, one or more sensors 20 operationally connected to the processor, and a display 30 operationally connected to the processor and located nonconformally with a pilot's view of a scene. Processor accepts inputs 14, 16, 18 from other aircraft systems (not shown). Inputs 14, 16, 18 may include information relating to the operating conditions of the aircraft A, such as airspeed, attitude, altitude, bearing, flight path vector, and the like. Inputs 14, 16, 18 also may include information relating to environmental conditions, such as air temperature, ground temperature, and the like. The inputs may also provide guidance information, such as instructions to the pilot to use a certain runway or taxiway. Processor 12 uses inputs 14, 16, 18 to generate symbology that represents information useful to operation of the aircraft. The symbology may include airspeed, bearing, attitude, taxiing instruction, and is similar in form to symbology generated by known head-up displays.

A sensor 20 is mounted on aircraft A, and in the depicted embodiment is mounted in the cockpit 22 of the aircraft as shown in FIG. 2. Sensor 20 is aimed in a direction D directly in front of the aircraft and is configured to sense radiation emanating from the scene in said direction. Sensor 20, when mounted in the cockpit, is selected to sense radiation that can pass through the windshield 24 of the aircraft, such as non-visible near-infrared radiation having wavelengths within a range of about 0.8 microns to about 1.5 microns. Because many landing and runway lights emit radiation within this range, sensor 20 provides a means to detect the location of landing lights even if not seen by the pilot. Alternatively, if solid-state runway lighting such as Light-emitting diodes (LEDs) are used, sensor 20 may be selected to sense visible radiation emanating from a narrow wavelength range emitted therefrom. A filter (not shown) may be used with the sensor to prevent unneeded wavelengths from being sensed by the sensor. Sensor alternatively may be mounted in the radome R of the aircraft, or in any other suitable location.

Figure 3:
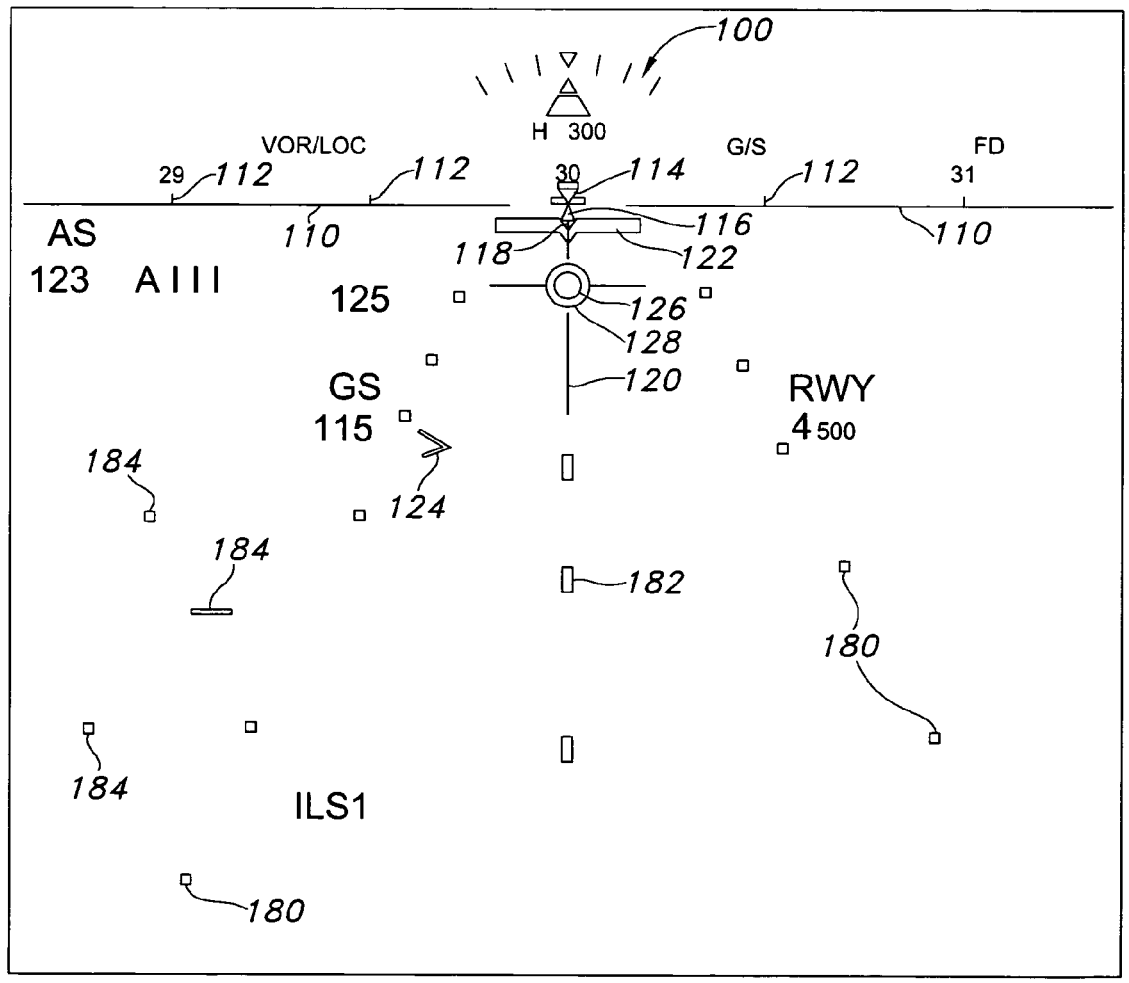
FIG. 3 is an output of a display according to the invention.
Figure 4:
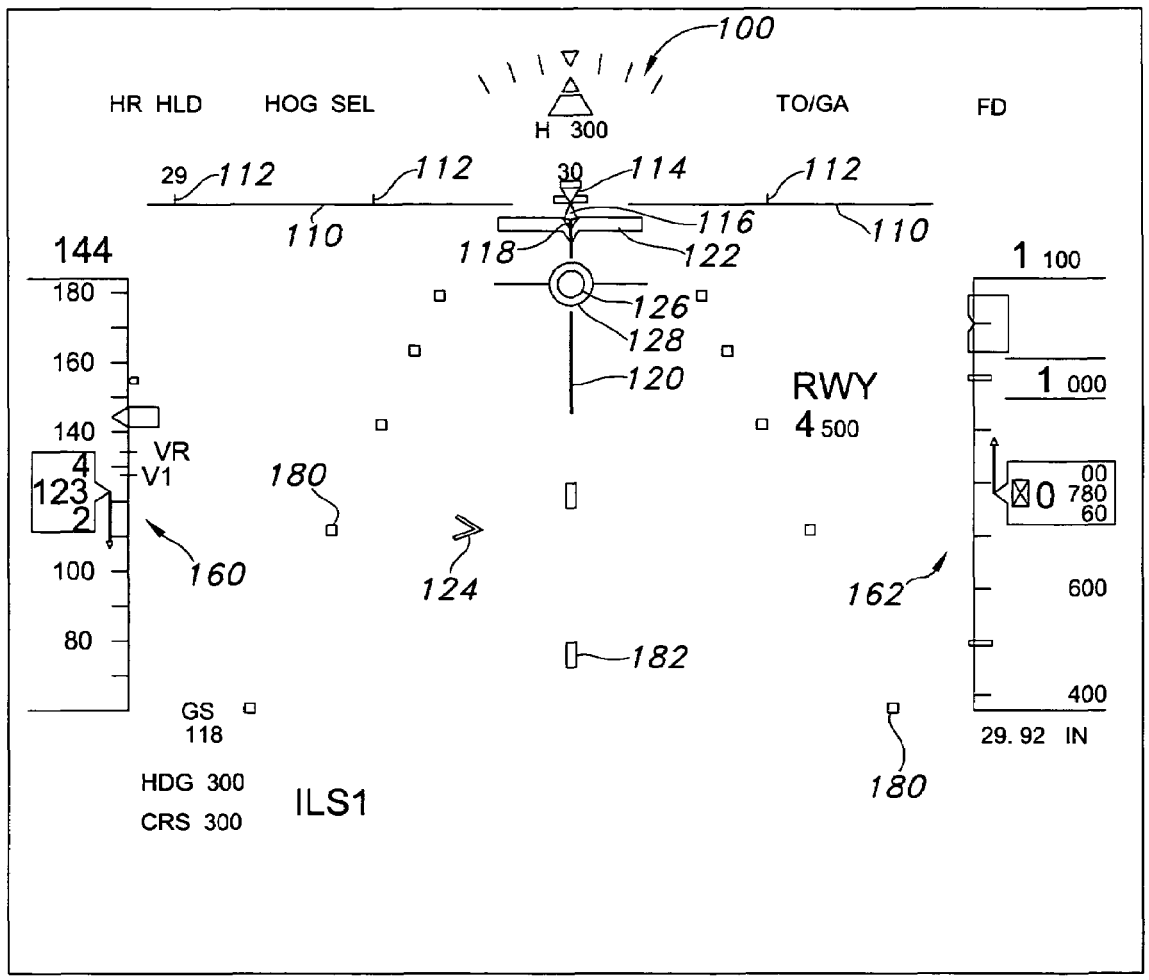
FIG. 4 is another output of a display according to the invention.

Sensor 20 provides an input 26 to processor 12, said input representing the radiation detected by the sensor. The processor formats the input from the sensor and generates a depiction of the scene corresponding to the detected radiation. Processor 12 combines the depiction with the generated symbology from inputs 14, 16 and 18, and the combined sensor depiction and symbology is rendered as shown by example in FIGS. 3 and 4. With reference to FIGS. 3 and 4, the symbology may include a roll scale and pointer symbol set 100 positioned above a two-segment horizon line 110 with vertical compass location markers 112. An inverted triangle 114 located in the space between the segments of horizon line 110 represents an aircraft heading index, the value of which is indicated by the digital readout "H 300." A triangle 116 with a vertical line 118 extending down from the middle of the bottom side of the triangle represents the selected course "dialed in" by the pilot. A vertical line 120 represents lateral deviation from the runway centerline. The reference location for lateral deviations is vertical line 118. An aircraft or "boresight" reference symbol 122 representing the projected longitudinal centerline of the aircraft provides a stationary reference for an aircraft acceleration symbol 124, which moves vertically with reference to boresight reference symbol 122. The term "aircraft acceleration" indicates situations in which the aircraft moves either in flight or on the ground, or is undergoing positive acceleration or negative acceleration, i.e. deceleration. The vertical offset of aircraft acceleration symbol 124 below boresight reference symbol 122 shows the actual acceleration or deceleration of the aircraft as the aircraft moves along a runway surface. As the aircraft travels down a runway, the pilot sees on head-down display the relative position of a ground roll guidance cue 126 to a ground roll reference symbol 128. The alphanumeric characters "RWY 4500" at reference number 130 represent the remaining runway length as measured in feet. Ground speed is represented alphanumerically at reference number 132. With particular reference to FIG. 3, which is an example of what may be generated by processor 12 during a landing operation, radiation sensed by sensor 20 and emitted by the runway centerline and the runway edge lights are shown at 180 and 182, respectively. Radiation emitted by taxiway lights is shown at 184. FIG. 4 presents an example what may be generated by processor 12 during a takeoff operation. The scales 160, 162 displayed on the left- and right-hand sides of head-down display represent an air speed tape and an altitude tape, respectively. Radiation emitted by runway centerline lights and runway edge lights are shown at 180 and 182, respectively. In both FIGS. 3 and 4, it can be seen that the combination of the sensor output and the generated symbology provides a representation of the scene in a format that may assist a pilot in operating the aircraft in poor weather conditions.

The representation generated by processor 12 is sent to a display 30. Display 30 is a head-down display, such as an avionics flight display or a multi-function display, which is configured to be mounted below the windshield 24 of the aircraft, as shown in FIG. 2. Display 30 preferably is an avionics display already installed in aircraft A and having display functionality normally associated with known avionics systems. During take-off, landing, and taxiing operations when visibility is poor, however, display 30 may display the representation combining the symbology and the sensor output as depicted in FIG. 3 or 4. Because the representation generated by the processor depicts lights or the runway environment that may not be visible to the pilot in poor weather conditions, the representation can be helpful to a pilot in such conditions. As shown in FIG. 2, the pilot looks from point P out windshield 24 toward the scene in a direction D1, but views display 30 in a direction D2 that is downward compared to direction D1. Display 30 can therefore be termed a 'head-down display' because the pilot must look down from viewing the scene to view the display. The representation of the scene as rendered by processor 12 is therefore not conformal to or overlaid upon the pilot's view of the scene, as would be the case if a HUD combiner were used to display the combined representation of the symbology and sensor outputs.

The invention may be varied in many ways while keeping with the spirit of the invention. For example, sensor 20 may be mounted on the aircraft in places other than the radome or the cockpit, but preferably at a position that is as close to the pilot as is feasible. An additional sensor 25 may be used to sense an additional wavelength range. For example, the additional sensor may sense infrared radiation in the mid-range infrared spectrum (i.e., from about 3 nm to about 5 nm) or the long-range infrared spectrum (i.e., from about 7 nm to about 13 nm). Alternatively, the additional sensor may form part of a millimeter-wave radar unit, which has shown promise in forming an image in adverse weather conditions. Such a radar unit emits radar waves in the millimeter wavelength and detects those waves reflected by objects in its path. The output of a millimeter-wave radar unit can be combined with sensor 20 to provide additional feature identification. The additional sensor may be mounted in any suitable position on the aircraft. If mounted in the radome R, a window W in the radome may be used to permit appropriate wavelength ranges of radiation to pass therethrough. Furthermore, sensor 20 and additional sensor 25 may be configured to detect any combination of the wavelength ranges discussed herein.

Another variation is that the symbology generated by processor 12 and displayed upon display 30 may include some or all of the symbols referenced herein, and may additionally or alternatively display other types of symbols. Furthermore, processor 12 may be an integral part of display 30, or may comprise an avionics computer configured to perform operations in addition to those required by the invention.

As described herein, the invention provides a pilot a non-conformal view of a combination of HUD symbology and outputs from one or more imaging sensors. An advantage of the invention is that an enhanced vision system (EVS) may be provided in an aircraft without room for a HUD combiner.

Another advantage of the invention is that it provides EVS functionality in a manner that is less expensive than an EVS with a HUD combiner.

Still another advantage is that existing avionics computers and/or displays can be used to render and display EVS information. Installation costs during manufacturing or retrofit operations are thereby significantly reduced.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. An enhanced vision system for an aircraft, comprising:
    a first imaging sensor mounted inside a cockpit of the aircraft and configured to detect a first range of radiation emanating from a scene;
    a second imaging sensor mounted in a radome of the aircraft and configured to detect a second range of radiation emanating from the scene;
    a display-generating processor operationally connected to the first and second imaging sensors and configured to generate, from inputs relating to aircraft operation, symbology representing information useful to operation of the aircraft, the display-generating processor further configured to combine the generated symbology with the first and second detected ranges of radiation to create a representation of the scene such that the generated symbology is scaled to conformally overlay the detected range of radiation;
    a display operationally connected to the processor, wherein the display is configured to display the representation of the scene such that the representation of the scene is non-conformal with a pilot's view out of a windshield of the aircraft.

2. The enhanced vision system of claim 1, wherein the range of radiation includes wavelengths in the near-infrared spectrum.

3. The enhanced vision system of claim 1, wherein the range of radiation is a range of visible wavelengths emitted by a solid-state runway light.

4. The enhanced vision system of claim 1, wherein the range of radiation comprises millimeter-wavelength radar waves.

5. The enhanced vision system of claim 1, wherein the information useful to the operation of the aircraft includes aircraft attitude data.

6. The enhanced vision system of claim 1, wherein the display is one of an avionics flight display and a multifunction display.

7. The enhanced vision system of claim 1, wherein the representation of the scene is displayed during one of a landing operation, a takeoff operation, and a taxiing operation.

8. The enhanced vision system of claim 1, wherein the display is located below a windshield of an aircraft.

9. An enhanced vision system for an aircraft, comprising:
    means for detecting a range of radiation emanating from a scene, the means for detecting located in a cockpit of the aircraft;
    means for generating symbology representing information useful to operation of the aircraft and for combining the generated symbology with the detected range of radiation to create a representation of the scene such that the generated symbology is scaled to conformally overlay the detected range of radiation, wherein the means for generating is operationally connected to the means for detecting;
    means for displaying the representation of the scene such that the representation of the scene is non-conformal with a pilot's view out of a windshield of the aircraft, wherein the means for displaying is operationally connected to the means for generating.

10. The enhanced vision system of claim 9, wherein the means for displaying is one of an avionics flight display and an avionics multifunction display.

11. The enhanced vision system of claim 9, wherein the means for displaying is located below a windshield of an aircraft.

12. The enhanced vision system of claim 9, wherein the means for detecting detects wavelengths in the near-infrared spectrum.

13. The enhanced vision system of claim 9, wherein the means for detecting is configured to detect substantially only visible wavelengths emitted by a solid-state runway light.

14. A method of providing enhanced vision system functionality in an aircraft, comprising:
    detecting, from a position inside a cockpit of the aircraft, a first range of radiation emanating from a scene;

detecting, from a position outside the cockpit of the aircraft, a second range of radiation emanating from the scene;

generating symbology representing information useful to operation of the aircraft;

combining the generated symbology with the first and second detected ranges of radiation to create a representation of the scene such that the generated symbology is scaled to conformally overlay the first and second detected ranges of radiation; and displaying the representation of the scene on an aircraft head-down display.

15. The method of claim 14, wherein the information useful to operation of the aircraft includes attitude data.

* * * * *